April 2, 1929.  D. PARRETT  1,707,316
TRACTOR
Filed Sept. 28, 1925  2 Sheets-Sheet 2
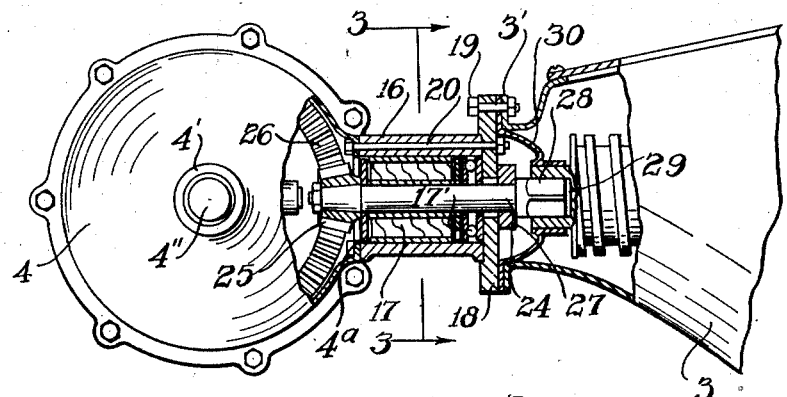
Fig. 2.
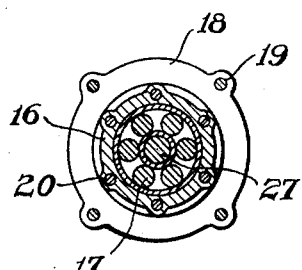
Fig. 3.
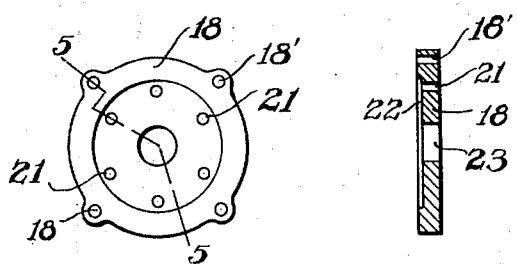 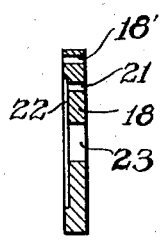
Fig. 4.  Fig. 5.

Patented Apr. 2, 1929.

1,707,316

UNITED STATES PATENT OFFICE.

DENT PARRETT, OF CHICAGO, ILLINOIS.

TRACTOR.

Application filed September 28, 1925. Serial No. 59,001.

This invention relates to tractors, it particularly relating to an arrangement for assembling the transmission and differential housings, together with the drive shaft connection between the transmission and differential devices of an automobile chassis, whereby the same can be readily converted into a tractor of the kind particularly described in my pending application Ser. No. 755,131, filed Dec. 11, 1924.

The purpose of this invention is to devise a simple and effective arrangement for converting the chassis of a used automobile, especially one of the Ford type, into a tractor, the particular purpose of this invention being to devise an arrangement for reassembling the rear axle and differential mechanism carried thereby so that it will occupy a position in close proximity to the transmission housing and form with said transmission housing a compact and simple arrangement whereby power may be transmitted from the rear axle to a pair of drive wheels located adjacent the forward end of the power unit.

A further and more specific object of the invention is to provide a simple and effective arrangement for connecting formerly widely separated transmission and differential housings rigidly and compactly together and for transmitting the power from the transmission devices to the differential gearing.

In the accompanying drawings:

Fig. 2 is a side view partly in longitudinal section of the transmission and differential housings and the connections between the same.

Fig. 3 is a section on the line 3—3 of Fig. 2.

Fig. 4 is an elevation of the adapter disk or plate employed in forming the connection between the housings.

Fig. 5 is a section on the line 5—5 of Fig. 4.

Figure 1:
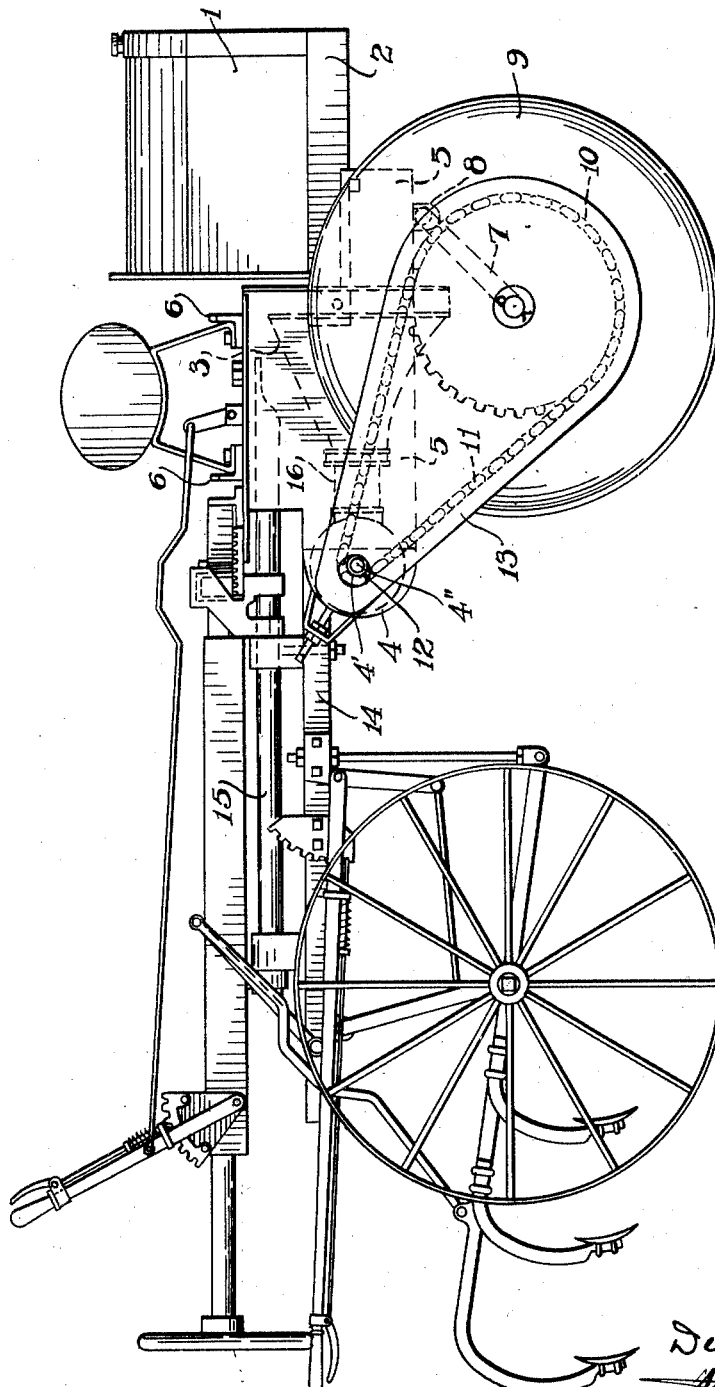
Fig. 1 is a side elevation of a machine embodying the improvements.

The general arrangement of the machine is the same as that described in my pending application and briefly referred to as follows: 1 represents a standard Ford automobile power plant mounted on the supporting frame members 2 which are cut off a short distance in the rear of the plant. 3 represents the transmission housing and 4 the differential housing containing the usual transmission and differential devices, the differential housing having the usual tubular extensions 4' which enclose the drive axles or shafts 4''. The frame upon which the parts are mounted is made of two wide vertical channels 5 constituting side plates and two cross pieces having their upper edges connected by cross pieces 6 preferably in the form of angle irons. The transmission housing and the differential housing and its extensions are supported by the frame referred to in the manner described in my pending application. An inverted U-shaped axle 7 is fastened to the under edges of the side plates 5 by U-bolts 8 and traction wheels 9 are rotatably mounted upon the horizontal ends of this axle. Each traction wheel has a large sprocket wheel 10 about which passes a sprocket chain 11 which also passes about a sprocket wheel 12 on its corresponding drive shaft 4''. Each set of sprocket wheels and its chain is enclosed in a housing 13 that is connected both to the supporting axle 7 and to the housing extension 4' so as to tie the two members together. An ordinary cultivator is shown connected with the tractor, the tongue 14 of which is connected to the draw-bar 15 in the manner described in my previous application. The same means for steering the tractor are shown, but will not be described as they form no part of the present invention.

In reconstructing the old chassis of a Ford automobile the long drive shaft and its casing which extend between the transmission and differential housings is discarded and the usual bearing housing 16 which contains the roller bearings 17 for the rear end of the drive shaft, as well as the thrust devices 17', is connected to the rear end of the transmission housing 3. To that end I employ a special adapter disk or plate 18 which is provided with a series of bolt holes 18' which are aligned with the originally established bolt holes of the flange 3' on the rear end of the transmission housing and is securely fastened thereto by the bolts 19. Before securing this disk in position, however, it is connected to the forward end of the bearing housing 16 by the bolts 20, the disk 18 being provided with a series of holes 21 to receive these bolts, these holes 21 being positioned to align themselves with the originally established bolt holes in the bearing housing. These bolts 20 also secure the housing 16 to the flange 4ª of the differential housing and are the same bolts which originally secure the housing to this flange 4ª and to the flange on the rear end of the discarded drive shaft casing. The disk 18 is provided with an annular recess 22 to receive and support the forward end of the housing 16 and is also provided with a central aperture 23 to accomadate a short shaft 24 which acts to connect the driving devices of the transmission housing with the differential gearing. The shaft 24 is about one-sixth the length of the standard Ford drive shaft. The rear end of this short shaft 24 has connected therewith the original bevelled pinion 25 which meshes with the bevelled ring gears 26 of the differential gearing. Its forward end is shouldered and has a collar 27 between the shoulder and the disk 17 and is also squared as at 28 to fit the square socket of the tail shaft 29 of the transmission. The member 30, which formed the socket part of a universal joint, as well as a bearing for the tail shaft in the original structure, is retained and serves only in the present structure as a bearing for the tail shaft, the outer flanged part of this member 30 being secured between the plate 17 and the flange 3' by the bolts 19.

By this arrangement I am enabled to readily and effectively couple up the rear axle with the rear end of the transmission housing by dispensing with the long drive shaft and its housing and substituting therefore a short shaft and adapter disk or plate; this plate having a series of bolt openings positioned to align themselves with the original bolt openings of the bearing and transmission housings.

Having thus described my invention, I claim:

1. In a structure of the character described, the combination of a transmission housing, a differential housing and a bearing housing of a standard motor vehicle chassis, said bearing housing and differential housing being arranged to be connected together, said bearing housing and transmission housing being each formed with a series of originally established points of attachment, one series of said points of attachment being located in different longitudinal planes from the other series, and an adapter plate provided with two series of points of attachment corresponding with the points of attachment of said housing, and located in the same vertical plane, whereby said bearing housing and transmission housing may be connected together through the medium of said adapter plate.

2. In a structure of the character described, the combination of a transmission housing, a differential housing and a bearing housing of a standard motor vehicle chassis, said transmission housing having a flange provided with originally established bolt holes which provide a place for attachment of the forward end of the propeller shaft casing in the original structure, said bearing housing also having bolt holes extending throughout the length thereof to receive bolts to connect the same to said differential housing, and an adapter plate provided with bolt holes corresponding to the bolt holes of both transmission housing and the bearing housing whereby it may be secured to both housings to connect said housings together.

In testimony whereof, I have hereunto set my hand this 6th day of August, 1925.

DENT PARRETT.